3,274,176
NOVEL PREPARATION OF ENAMINES AND
NOVEL PRODUCTS
Jacques Dubé, Eaubonne, France, assignor to Roussel-
UCLAF, Paris, France, a corporation of France
No Drawing. Filed Oct. 14, 1964, Ser. No. 403,936
Claims priority, application France, Oct. 18, 1963,
951,070
16 Claims. (Cl. 260—239.5)

The invention relates to a novel process for the preparation of enamines of 3-keto-$\Delta^{1,4}$-steroids in high yields and to novel enamines of 3-keto-$\Delta^{1,4}$-steroids.

The protection of 3-keto groups in steroids in the form of enamines has been studied for many years but until now the formation of enamines of 3-keto-$\Delta^{1,4}$-steroids has not appeared possible. For example, a thorough study of a series of articles by Herr et al. (J.A.C.S., vol. 74 (1952), p. 3,627; vol. 75 (1953), p. 1,918; vol. 75 (1953), p. 5,927; vol. 78 (1956), p. 500) and by Johnson et al. (J.A.C.S., vol. 78 (1956), p. 430) who have studied the formation of numerous enamine steroids, has not led to the discovery of a single example of an enamine of a 3-keto-$\Delta^{1,4}$-steroid.

French Patent No. 1,229,628 recommends the protection of certain 3-keto-$\Delta^{1,4}$-steroids by conversion into enamines without specifying the structure of the products which they wish to obtain. The only example of the patent which describes the formation of an enamine is Example 4 which reacts the steroid with pyrrolidine in benzene in the presence of p-toluene sulfonic acid. Upon repeating Example 4, there was found in the reaction product a large amount of unchanged starting material, a small quantity of resin consisting mostly of unchanged starting material and very little of enamine in the form of a 3-amino-$\Delta^{1,3,5}$-steroid with a total absence of any 1,3-diamino-$\Delta^{3,5}$-steroid. Hogg et al. (Steroids, vol. 3, No. 2 (1964), p. 189) have shown that the product produced by the said process is a mono-nitrogenous enamine.

It is an object of the invention to provide a novel process for the preparation of enamines of 3-keto-$\Delta^{1,4}$-steroids in high yields.

It is another object of the invention to provide novel 1,3-diamino-$\Delta^{3,5}$-steroids.

It is a further object of the invention to provide novel 3-amino-$\Delta^{1,3,5}$-steroids.

These and other objects and advantages of the invention will become obvious from the following detailed description.

The novel process of the invention for the preparation of enamines of 3-keto-$\Delta^{1,4}$-steroids comprises reacting the 3-keto-$\Delta^{1,4}$-steroid with a secondary amine of the formula

wherein R and R' are selected from the group consisting of lower alkyl, hydroxy lower alkyl, cycloalkyl, aralkyl and aryl radicals and when taken together with the nitrogen atom form a 5 to 6 member heterocyclic radical in the absence of a solvent and a catalyst at temperatures up to reflux temperatures to form the corresponding 1,3-diamino-$\Delta^{3,5}$-steroid. The said product can be heated under vacuum to form the corresponding 3-amino-$\Delta^{1,3,5}$-steroid.

The reaction is illustrateed below:

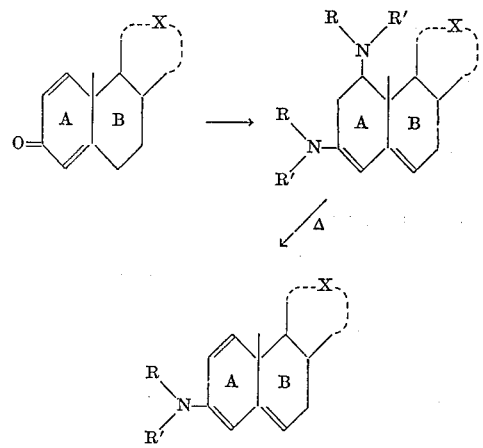

wherein X represents the remainder of the steroid molecule and R and R' have the above definition.

The 3-keto-$\Delta^{1,4}$-steroids may contain other substituents such as hydroxy, acyloxy, alkoxy, halogens such as fluorine, keto, aliphatic radical such as methyl, ethyl or ethynyl, etc. attached to one or more carbon atoms of the steroid nucleus such as in the 7, 9, 11, 12, 17 and other positions. The steroid may also contain double bonds other than the $\Delta^{1,4}$-double bonds. If a lateral chain exists in the 17-position, it may be any of the natural lateral chains such as those in the bile acids, in sterols and pregnanes such as progesterone or the lateral chains may also be modified by various substitutions or degradations.

Examples of suitable 3-keto-$\Delta^{1,4}$-steroids useful as starting materials for the process of the invention are compounds of the androstene series such as $\Delta^{1,4}$-androstadiene-3,17-dione, $\Delta^{1,4}$-androstadiene-3,11,17-trione, $\Delta^{1,4,9,(11)}$-androstatriene - 17$\beta$-ol-3-one, $\Delta^{1,4}$-androstadiene-11$\alpha$-ol-3,17-dione, $\Delta^{1,4}$ - androstadiene - 17$\beta$-ol-3,11-dione, etc. and compounds of the pregnane series such as 17$\alpha$-acetoxy-$\Delta^{1,4}$ - pregnadiene - 11$\beta$ - ol-3,20-dione, $\Delta^{1,4}$-pregnadiene-17$\alpha$ - ol - 3,11,20 - trione, 9$\alpha$-fluoro-16-methylene-$\Delta^{1,4}$-pregnadiene - 11$\beta$,17$\alpha$ - diol - 3,20 - dione, 9$\alpha$-fluoro-16$\alpha$-methyl - $\Delta^{1,4}$ - pregnadiene - 11$\beta$,17$\alpha$-diol-3,20-dione, 9$\alpha$-fluoro - 16$\alpha$ - methyl - $\Delta^{1,4}$ - pregnadiene-17$\alpha$-ol-3,11,20-trione, etc.

Examples of suitable secondary amine reactants are N,N-dilower alkyl amines such as diethylamine, dipropylamine, dibutylamine, dihexylamine, N-ethyl-N-butyl-amine, etc.; cycloamines such as dicyclohexylamine; N-lower alkyl-N-aralkyl amines such as N-methyl-N-benzyl-amine, N-ethyl-N-benzylamine, etc.; N-lower alkyl-N-arylamines such as N-methylaniline, N-methyltoluidine, etc.; hydroxy lower alkyl amines such as diethanolamine, etc.; and heterocyclic amines such as piperidine, pyrrolidine, tetrahydroquinoline, oxazolidine, morpholine, etc. The preferred amine is pyrrolidine.

The 1,3-diamino-$\Delta^{3,5}$-steroids and the 3-enamino-$\Delta^{1,3,5}$-steroids have an excellent stability to various reagents, particularly to common reducing agents such as alkali metal borohydrides and lithium aluminum hydride and are easily hydrolyzed into 3-keto-$\Delta^{1,4}$-steroids. Therefore, the said enamines are useful for protecting the 3-keto group while effecting conversions in other portions of the molecule such as reducing a keto group to a hydroxy group. A 3-keto group conjugated with double bonds in the 1 and 4-positions may be converted into the corresponding 1,3-diamino-Δ³,⁵-steroid in a selected manner in the presence of other keto groups not conjugated to a double bond in the steroid molecule. For example, Δ¹,⁴-androstadiene-17β-ol-3-one (Δ¹-testosterone), which is physiologically active, can be prepared from Δ¹,⁴-androstadiene-3,17-dione by passing through the corresponding 1,3-diamino-Δ³,⁵-androstadiene-17-one or 3-amino-Δ¹,³,⁵-androstatriene-17-one which is reduced and then hydrolyzed as illustrated in Examples II, III, VI and VII.

In the following examples there are described several preferred embodiments to illustrate the invention. However, it should be understood that the invention is not intended to be limited to the specific embodiments.

EXAMPLE I

*Preparation of 1,3-dipyrrolidyl-Δ³,⁵-androstadiene-11,17-dione*

5 gm. of Δ¹,⁴-androstadiene-3,11,17-trione were introduced into 15 cc. of pyrrolidine and the mixture was heated to reflux under an atmosphere of nitrogen for 15 hours. The excess pyrrolidine was removed by distillation under vacuum at temperatures not greater than 40° C., and the residue was crystallized in 50 cc. of methanol to obtain 5.52 gm. of 1,3-dipyrrolidyl-Δ³,⁵-androstadiene-11,17-dione having a melting point of 170–175° C. Upon recrystallization from isopropanol for analysis the product had a melting point of 182° C. and a specific rotation $[\alpha]_D^{20} = +290°$ (c.=0.5% in benzene).

Infra-red spectography in chloroform confirmed a ketone group in the 17-position at 1740 cm.$^{-1}$, a ketone group in the 11-position at 1700 cm.$^{-1}$, as well as the absorptions characteristic of the enamine system of ketones joined with a single bond at 1630 and 1610 cm.$^{-1}$.

*Analysis.*—$C_{27}H_{38}O_2N_2$; molecular weight=422.59: Calculated—C, 76.73%; H, 9.06%; N, 6.63%. Found—C, 76.4%; H, 8.9%; N, 6.5%.

This compound is not described in the literature.

EXAMPLE II

*Preparation of 1,3-dipyrrolidyl-Δ³,⁵-androstadiene-17-one*

In a manner similar to that described in Example I, but starting with Δ¹,⁴-androstadiene-3,17-dione, 1,3-dipyrrolidyl-Δ³,⁵-androstadiene-17-one was crystallized from methanol in a yield of 70% and had a melting point of 148° C. Upon recrystallization from dimethylformamide, the melting point did not change and the specific rotation was $[\alpha]_D^{20} = +140°$ (c.=1% in benzene).

Infra-red spectrography in chloroform confirmed the absorptions characteristic for the enamine system of ketones joined in a single bond at 1630 and 1605 cm.$^{-1}$ and a ketone group in the 17-position toward 1732 cm.$^{-1}$.

The N.M.R. spectra disclosed two protuberances toward $\tau=8.14$ and 6.80 characteristic for protons of the pyrrolidine group in enamine, and the H⁴ and H⁶ protons were disclosed at $\tau=5.18$ and 4.95.

*Analysis.*—$C_{27}H_{40}ON_2$; molecular weight=408.61: Calculated—C, 79.36%; H, 9.86%; N, 6.86%. Found—C, 79.3%; H, 9.6%; N, 7.1%.

This compound is not described in the literature.

EXAMPLE III

*Preparation of 3-pyrrolidyl-Δ¹,³,⁵-androstatriene-17-one*

1 gm. of 1,3-dipyrrolidyl-Δ³,⁵-androstadiene-17-one was heated under vacuum to 150° C., and melting of the product with evolution of gas and crystallization occurred. The product obtained was purified by recrystallization from 8.3 cc. of dimethylformamide to obtain a yield of 56% of 3-pyrrolidyl-Δ¹,³,⁵-androstatriene-17-one having a melting point of 220° C. and a specific rotation $[\alpha]_D^{20} = -268°$ (c.=0.5% in benzene). The ultraviolet spectra in ethanol containing 1% of pyrrolidine showed inflection toward 283 m$\mu$, $\epsilon=17,300$—$\lambda$ max.=290 m$\mu$, $\epsilon=17,900$—inflection about 299 m$\mu$, $\epsilon=16,100$—$\lambda$ max.=359 m$\mu$, $\epsilon=150$.

Infra-red spectrography in chloroform confirmed a ketone group in the 17-position at 1732 cm.$^{-1}$ and a trienic system substituted by a hetero atom at 1645, 1615 and 1560 cm.$^{-1}$. The N.M.R. spectra showed the 18- and 19-methyl groups at $\tau=9.10$ and 8.83 respectively; at $\tau=8.13$ and 6.84, four protons characteristic for the pyrrolidine group, and at $\tau=5.18$ and 4.86 the H⁴ and H⁶ protons and finally at $\tau=3.96$ and 3.94 the ethylenic H¹ and H² protons were shown circular dischronism—$\Delta$, $\epsilon=-3.86$ to 370 m$\mu$.

*Analysis.*—$C_{23}H_{31}ON$; molecular weight=337.49: Calculated—C, 81.85%; H, 9.26%; N, 4.74%. Found—C, 81.8%; H, 9.0%; N, 4.4%.

This compound is not described in the literature.

In similar manner, 3-pyrrolidyl-Δ¹,³,⁵-androstatriene-11,17-dione was obtained, starting from 1,3-dipyrrolidyl-Δ³,⁵-androstadiene-11,17-dione.

This compound is not described in the literature.

EXAMPLE IV

*Preparation of Δ¹,⁴-androstadiene-3,17-dione*

1 gm. of 1,3-dipyrrolidyl-Δ³,⁵-androstadiene-17-one was dissolved in 1 cc. of acetic acid at a temperature of 25° C. and then the solution was diluted with 10 cc. of water and left standing at room temperature for 1 hour. Then the solution was made alkaline by adding 1.8 cc. of 36° Bé. sodium hydroxide solution and was left standing for 24 hours. The precipitate thus formed was vacuum filtered, washed and dried to obtain 625 mg. (89% yield) of Δ¹,⁴-androstadiene-3,17-dione having a melting point of 142° C. This product was identical in every respect to the product which served as the starting material in Example II.

EXAMPLE V

*Preparation of Δ¹,⁴-androstadiene-3,17-dione*

In a manner similar to that described in Example IV, a 75% yield of Δ¹,⁴-androstadiene-3,17-dione having a melting point of 142° C. was obtained from 3-pyrrolidyl-Δ¹,³,⁵-androstatriene-17-one. Upon mixing the said product with Δ¹,⁴-androstadiene-3,17-dione, the starting material of Example II, there was no lowering of the melting point.

EXAMPLE VI

*Preparation of Δ¹-testosterone*

200 mg. of 3-pyrrolidyl-Δ¹,³,⁵-androstatriene-17-one were dissolved in 6 cc. of tetrahydrofuran and the resulting solution, over a period of 15 minutes, was introduced into a suspension of 118 mg. of lithium-aluminum hydride in 3.6 cc. of tetrahydrofuran cooled to about +3° C. The reaction mixture was agitated for 15 minutes under sustained cooling and after the excess lithium-aluminum hydride was destroyed with ethyl acetate, an aqueous solution of sodium-potassium tartrate and sodium bicarbonate was introduced. After extracting the aqueous phase with methylene chloride and washing the organic extract, the mitxure was evaporated to dryness under vacuum to obtain 3-pyrrolidyl-Δ¹,³,⁵-androstatriene-17β-ol which upon hydrolysis conducted according to the method of Example IV gave a yield of 70% of Δ¹,⁴-androstadiene-17β-ol-3-one (Δ¹-testosterone) having a melting point of 172° C. and the product was identical in all respects to a sample of the same product prepared in another manner.

EXAMPLE VII

*Preparation of Δ¹-testosterone*

In a similar manner as in Example VI, 1,3-dipyrrolidyl-Δ³,⁵-androstadiene-17-one was converted directly into Δ¹-testosterone, identical to the product obtained starting from 3-pyrrolidyl-Δ¹,³,⁵-androstatriene-17-one, by passing through 1,3 - dipyrrolidyl-$\Delta^{3,5}$-androstadiene-17β-ol. The yields of this reaction were comparable to those obtained in the preceding examples.

Various modifications of the process of the invention may be made without departing from the spirit or scope thereof and it is to be understood that the invention is to be limited only as defined in the appended claims.

I claim:

1. A process for the preparation of 1,3-diamino-$\Delta^{3,5}$-steroids of the androstane and pregnane series of the formula

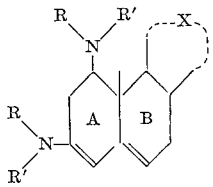

wherein X represents the remainder of the steroid molecule and R and R' are selected from the group consisting of lower alkyl, hydroxy lower alkyl, cyclohexyl, benzyl, phenyl, anilino and tolyl and when R and R' are taken together with the nitrogen atom they form a 5 to 6 member heterocyclic group which comprises reacting a 3-keto-$\Delta^{1,4}$-steroid with a secondary amine of the formula

wherein R and R' have the above definition in the absence of a solvent and a catalyst at temperatures up to reflux temperatures to form the corresponding 1,3-diamino-$\Delta^{3,5}$-steroid.

2. The process of claim 1 wherein the 1,3-diamino-$\Delta^{3,5}$-steroid is heated under vacuum to form the corresponding 3-amino-$\Delta^{1,3,5}$-steroid.

3. A process for the preparation of 1,3-dipyrrolidyl-$\Delta^{3,5}$-androstadiene-11,17-dione which comprises reacting $\Delta^{1,4}$-androstadiene-3,11,17-trione with pyrrolidine in the absence of solvent and catalyst to form 1,3-dipyrrolidyl-$\Delta^{3,5}$-androstadiene-11,17-dione.

4. The process of claim 3 wherein 1,3-dipyrrolidyl-$\Delta^{3,5}$-androstadiene-11,17-dione is heated under vacuum to form 3-pyrrolidyl-$\Delta^{1,3,5}$-androstatriene-11,17-dione.

5. A process for the preparation of 1,3-dipyrrolidyl-$\Delta^{3,5}$-androstadiene-17-one which comprises reacting $\Delta^{1,4}$-androstadiene-3,17-dione with pyrrolidine to form 1,3-dipyrrolidyl-$\Delta^{3,5}$-androstadiene-17-one.

6. The process of claim 5 wherein 1,3-dipyrrolidyl-$\Delta^{3,5}$-androstadiene-17-one is heated under vacuum to form 3-pyrrolidyl-$\Delta^{1,3,5}$-androstatriene-17-one.

7. A process for the preparation of $\Delta^1$-testosterone which comprises reacting $\Delta^{1,4}$-androstadiene-3,17-dione with pyrrolidine to form 1,3-dipyrrolidyl-$\Delta^{3,5}$-androstadiene-17-one, reducing the latter with lithium aluminum hydride to form 1,3-dipyrrolidyl-$\Delta^{3,5}$-androstadiene-17β-ol and hydrolyzing the latter under acidic conditions to form $\Delta^1$-testosterone.

8. A process for the preparation of $\Delta^1$-testosterone which comprises reacting $\Delta^{1,4}$-androstadiene-3,17-dione with pyrrolidine to form 1,3-dipyrrolidyl-$\Delta^{3,5}$-androstadiene-17-one, heating the latter under vacuum to form 3-pyrrolidyl-$\Delta^{1,3,5}$-androstatriene-17-one, reducing the latter with lithium aluminum hydride to form 3-pyrrolidyl-$\Delta^{1,3,5}$-androstatriene-17β-ol and hydrolylzing the latter under acidic conditions to form $\Delta^1$-testosterone.

9. An enamine steroid selected from the group consisting of steroids of the androstane and pregnane series of the formula

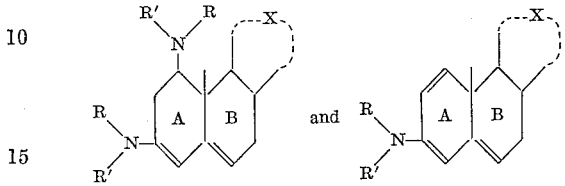

wherein X represents the remainder of the steroid molecule and R and R' together with the nitrogen atom form a 5 to 6 member heterocyclic radical.

10. A compound selected from the group consisting of steroids of the formula

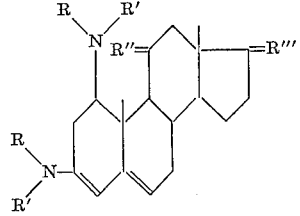

and

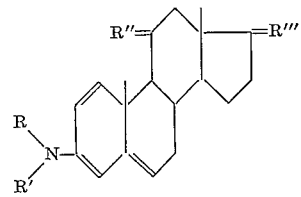

wherein R and R' together with the nitrogen atom form a 5 to 6 member heterocyclic radical, R" is selected from the group consisting of =O and

and R''' is selected from the group consisting of =O and

11. 1,3-dipyrrolidyl-$\Delta^{3,5}$-androstadiene-17-one.
12. 1,3-dipyrrolidyl-$\Delta^{3,5}$-androstadiene-11,17-dione.
13. 3-pyrrolidyl-$\Delta^{1,3,5}$-androstatriene-17-one.
14. 3-pyrrolidyl-$\Delta^{1,3,5}$-androstatriene-11,17-dione.
15. 3-pyrrolidyl-$\Delta^{1,3,5}$-androstatriene-17β-ol.
16. 1,3-dipyrrolidyl-$\Delta^{3,5}$-androstadiene-17β-ol.

No references cited.

LEWIS GOTTS, *Primary Examiner.*

HENRY A. FRENCH, *Assistant Examiner.*